US006920089B1

(12) United States Patent
Steinbach

(10) Patent No.: US 6,920,089 B1
(45) Date of Patent: Jul. 19, 2005

(54) SYSTEM AND METHOD FOR DELIVERY OF AUDIO CONTENT CORRELATED TO THE CALENDAR DATE AND/OR TIME OF DAY

(76) Inventor: Scott Bowman Steinbach, 2224 Ciatzolindia Dr., Waco, TX (US) 76710

( * ) Notice: Subject to any disclaimer, the term of this patent is extended or adjusted under 35 U.S.C. 154(b) by 201 days.

(21) Appl. No.: 10/264,108

(22) Filed: Oct. 3, 2002

Related U.S. Application Data

(63) Continuation-in-part of application No. 09/614,475, filed on Jul. 11, 2000, now Pat. No. 6,483,782.

(51) Int. Cl.$^7$ .............................................. G11B 31/00
(52) U.S. Cl. .............................. 369/22; 369/6; 368/244
(58) Field of Search .............................. 369/22, 23, 19, 369/20, 21, 6, 7; 368/72, 73, 94, 109, 156, 272, 244, 250; 455/344, 349, 351; 340/500, 501, 506

(56) References Cited

U.S. PATENT DOCUMENTS

| 5,212,672 | A | * | 5/1993 | Loisch et al. .................. 368/79 |
| 5,365,494 | A | | 11/1994 | Lynch ........................... 368/10 |
| 5,369,797 | A | * | 11/1994 | Tyree ........................... 455/349 |
| D365,823 | S | * | 1/1996 | Borgonovo .................. D14/168 |
| 5,555,536 | A | * | 9/1996 | Rolf et al. ...................... 369/19 |
| 5,621,458 | A | * | 4/1997 | Mann et al. ............. 348/231.5 |
| 5,832,067 | A | | 11/1998 | Herold ................... 379/110.01 |
| 6,310,833 | B1 | * | 10/2001 | Guyett et al. .................. 368/63 |
| 6,483,782 | B1 | * | 11/2002 | Steinbach ....................... 369/6 |
| 2002/0072326 | A1 | * | 6/2002 | Qureshey et al. .......... 455/3.02 |
| 2003/0095476 | A1 | * | 5/2003 | Mollicone et al. .......... 368/250 |
| 2003/0142591 | A1 | * | 7/2003 | Baweja et al. .............. 368/263 |
| 2003/0198137 | A1 | * | 10/2003 | Gorden ......................... 368/12 |

FOREIGN PATENT DOCUMENTS

| DE | 39-18344 A1 | * | 12/1990 | .................. 369/22 |
| EP | 339316 A2 | * | 11/1989 | .................. 369/22 |

* cited by examiner

Primary Examiner—Tan Dinh
(74) Attorney, Agent, or Firm—Koestner Bertani, LLP

(57) ABSTRACT

An apparatus and method are provided for automatically playing a recorded message, from a uniquely formatted encrypted CD, correlated to a specific date and a time of day as an option on a CD clock radio or the like. Disclosed are means for distinguishing the unique CD format and thereafter following a prescribed process for decrypting and playing. Otherwise all device functions and options operate in their conventional modes.

19 Claims, 6 Drawing Sheets

SEQUENTIAL OPERATION FLOW CHART

SYSTEM AND METHOD FOR DELIVERY OF AUDIO CONTENT CORRELATED TO THE CALENDAR DATE AND/OR TIME OF DAY

RELATED APPLICATION

This Application is a continuation in part of and incorporates by reference U.S. patent application Ser. No. 09/614,475 entitled "TIME MESSAGE DELIVERY CD PLAYER ALARM CLOCK" filed on Jul. 11, 2000 to Scott Bowman Steinbach now U.S. Pat. No. 6,483,782.

TECHNICAL FIELD OF THE INVENTION

The present invention relates to an electronic alarm clock equipped with a CD player. More particularly, it relates to a CD player clock device for playing date/time-correlated material.

BACKGROUND OF THE INVENTION

Clock radios, which provide for a user to choose when and to what they will awaken are well known. Users may awaken to an alarm signal, AM or FM radio stations, or a CD or tape recording.

U.S. Pat. No. 5,832,067 to Herold discloses apparatus for transferring information from a server as a function of data input to the server so that a user may preselect a message to be played at a specific time.

U.S. Pat. No. 5,360,494 discloses a radio alarm clock with a capability to display user input reminders for calendar events.

The choices offered to users for waking, reminder or alarm sounds are limited to user chosen CDs, radio bands and stations, or perhaps a previously set reminder. It would be desirable to have other wake-up, reminder or alarm sound options.

SUMMARY OF THE INVENTION

The present invention provides a CD clock radio that substantially eliminates or reduces disadvantages and problems associated with previously developed alarm clocks.

More specifically, the present invention provides a CD clock radio with an additional function for CD Alarm Radios. This feature allows a user to wake to a buzzer or recorded information uniquely correlated to the calendar date and time of day. This is accomplished by providing in the CD player device an apparatus for distinguishing between standard format CD recordings or specially formatted CD recordings formatted in accordance with the invented device.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

Figure 1:
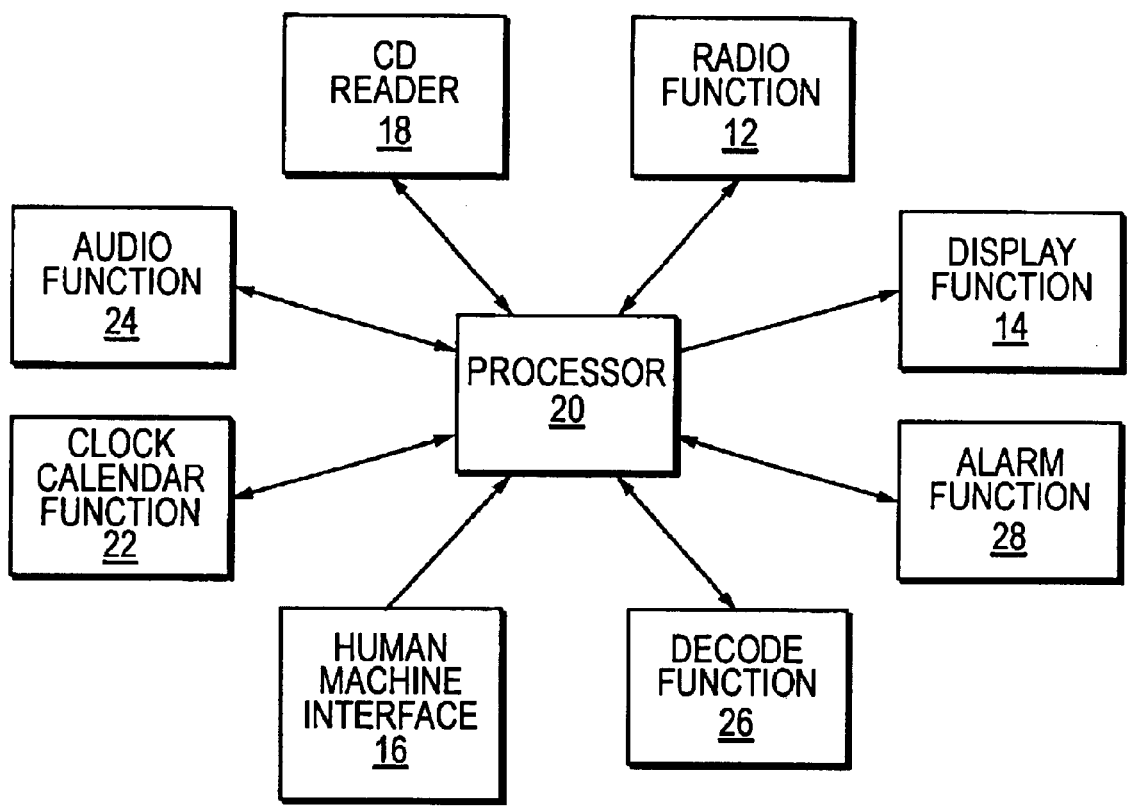
FIG. 1 depicts a block diagram of a CD player in accordance with the present invention.

FIG. 1 shows the major components of a clock radio embodying the present invention in block form. In one embodiment, the enhanced CD player uses a multiprocessor design that utilizes a commercially available Compact Disk (CD ROM) transport coupled to an electronics assembly implementing the enhanced CD functionality through a combination of custom hardware and specially designed embedded firmware. The major hardware assemblies are the CD ROM drive, the main printed circuit board (PCB), a power supply, a display LCD, a keyboard, volume and function selector controls, an AM/FM radio module and two small stereo speakers. These major assemblies are common in function to most CD players and are not considered unique to the enhanced CD functionality. The CD ROM drive used may be but is not limited to a commercially available drive typically used in a notebook type personal computer. These drives have been selected primarily due to the limited space available. The CD ROM drive interfaces with the main electronics PCB through a standard Advanced Technology Attachment Packet Interface (ATAPI). The drive is used in an unmodified condition. Moreover, it is envisioned that a "bare bones" CD transport mechanism coupled with a chipset specifically designed for the transport control function may be used. The main PCB used is designed to fulfill the requirements of the enhanced CD player.

In order to implement the functionality required in the specification, a multiprocessor design was implemented as the processing function resident on the PCB. The two microcontrollers used in this design are functionally segregated with each microcontroller performing its specific tasking and passing data to the various other hardware assemblies and each other via an internal bi-directional digital data bus. The first microcontroller, which in this embodiment is the PIC 16C924, primarily performs the tasks having to do with the clock and display functions while the other microcontroller, the PIC 16F877, primarily transfers control, command and digital audio data to and from the CD ROM drive.

The main PCB also supports the power supply, the LCD interface, the CD ROM drive interface, the keyboard interface, the AM/FM radio, the audio digital-to-analog converter, the audio multiplexer, the audio amplifier and the operator controls. The clock microcontroller primarily processes and displays the information presented to the operator on the LCD module. Here, the microcontroller has its own firmware program to implement the enhanced CD player specification. Data transferred to this device include operator inputs from the keyboard for various mode and parameter selections, the LCD display functions relating to the alarms, the radio, the CD and the clock. The CD microcontroller primarily controls the CD ROM drive and reads the digital data, both audio and control data, from the CD ROM drive.

The functionality of the enhanced CD player is implemented in the firmware program of the microcontroller. This firmware, in conjunction with the specially formatted enhanced CD, is a major difference between an enhanced CD player and other commercially available CD players. The microcontroller, in conjunction with the firmware programming, detects the enhanced CD, either the time/date enhanced CD format or the sequential enhanced CD format. This microcontroller also communicates with the clock microcontroller to pass necessary data such as track information, play and stop commands, etc. This interface between the CD and clock microcontroller transmits over a standard Multimaster I2C bus.

Two single channel (stereo) audio amplifiers on the main PCB condition and amplify signals received from the CD ROM or the radio for output to the speakers contained within the unit enclosure. Unregulated DC power, supplied to the main PCB via a coaxial jack on the unit, is regulated and conditioned by power supply circuitry on the PCB into the voltage levels required by the various electronics assemblies (CD ROM drive, the microcontrollers, the LCD and the audio amplifiers, etc.). The LCD module displays data to the operator. A keyboard such as a 12 key matrix design or other like design known to those skilled in the art, allows the operator to enter the parameters and data necessary for unit operation. The data that can be entered via this keyboard is: alarm time 1,2; radio tune up, tune down and on/off, AM/FM; CD play, stop, track up, track down; and date, time set.

The AM/FM radio may be a commercially available unit repackaged for mounting within the prototype enclosure. The radio should be able to be digitally tuned by the microcontroller in response to user initiated keyboard tune up-tune down commands. The radio on/off function is controlled by the microcontroller depending on the mode of operation selected by the operator.

An audio multiplexer selects either the dual channel audio output or the CD ROM audio as the input to the audio amplifier. This selection is again controlled by the microcontroller based on the user mode commands. An ADAC converts the digital data originating in the CD ROM drive to dual channel audio signals fed to the audio multiplexer. The ADAC, controlled by the CD microcontroller, is muted when control data is being read from the CD ROM drive. Likewise, the ADAC is enabled by the microcontroller when audio from the CD ROM drive is being played through the system. The audio multiplexer is essentially a microcontroller controlled selector switch. The audio inputs from either the ADAC (CD ROM drive) or the AM/FM radio is presented to the audio multiplexer for routing to the audio amplifier. Depending on the user mode selected, the microcontroller will select either the ADAC or radio for routing to the audio amplifier.

The audio amplifier receives two audio channels from the audio multiplexer and conditions (amplifies) these signals for driving the stereo speakers. The audio amplifier has variable gain that is controlled by the setting of the volume control by the user on the front panel. These front panel controls are self explanatory in function. The selector allows a user to select either the CD, the Radio or the buzzer for activation upon an alarm condition. The volume control allows the operator to control the audio volume to the stereo speakers. In this embodiment, two small 8-ohm speakers are used to provide the audio sourced from either the radio or the CD to the operator.

The enhanced CD player firmware controls all functions within the player and is divided physically between the Clock and CD microcontrollers. As might be expected, the firmware in the clock micro controls the clock and most of the data presented in the LCD whereas the CD firmware located in the CD micro controls the functions that have to do primarily with the CD ROM drive. Most of the items that are unique to the enhanced functionality of the CD player reside in this firmware. A more detailed description of the firmware in both microcontrollers follows. The firmware program in the clock module primarily controls the data displayed on the LCD. Any data displayed is sourced from the CD ROM module, the keyboard or the front panel controls. The keyboard module directly interfaces to this microcontroller and any switch depressions (keysets) or static switch positions are sensed and processed by the firmware program. The keyboard processing firmware receives inputs designating the alarm switch position (alarm 1 or alarm 2), the radio tune up-tune down keysets, the radio on/off status, the CD ROM play, stop, track up and track down keysets and the clock data and time switch selections. All these status inputs are used by the firmware to determine exactly which firmware to execute and the specific times (if appropriate) to execute that function.

The clock module in the clock microcontroller receives inputs via the multimaster I2C bus from the CD microcontroller. These inputs consist primarily of the type of CD detected in the CD ROM drive, the number of tracks on the CD, specific CD track information and whether or not a CD is currently inserted in the drive. All this information is presented to the clock module in order to ascertain the current device status and to provide the information necessary for proper clock module firmware routine execution. The CD module also sends output data to the CD microcontroller via the multimaster I2C bus. This information consists primarily of CD drive control information (play, stop) and date, time and track information for the time/date enhanced CD function. Additionally, a non-volatile program memory is attached to this micro and program parameters important to the firmware processing are maintained in this memory. The CD module firmware program resides in the CD control microcontroller and controls the CD ROM drive by issuing control commands in an ATAPI format and reading the data streams from the CD ROM drive. Firmware processing of this data implements the enhanced CD functionality or processing the data for the standard CD player functions. This firmware module determines whether the CD contained in the CD ROM drive is a standard formatted music CD or is a specially formatted enhanced CD. In the event the detected CD is an enhanced object, the firmware makes a further determination if the enhanced CD is a time/date or sequential function CD. If the type code read from track zero is a logical zero, then the time/date CD is present. If the type code is a logical one then the CD is sequentially formatted. This decision branch conditions further firmware execution.

If the CD is a sequentially formatted CD, the first eight bytes read from the CD provide the necessary information for playing the reminder of the CD in the sequential format. In the event the type code designates the CD as the time/date format the, in addition to the first eight bytes, the time and track information for each selection on the disk is also read into the microcontroller memory.

The enhanced CD player differs from existing designs, in that it has the ability to use specially formatted compact discs. These CD ROMs allow the user to play recorded information uniquely correlated to that particular time and date or to sequentially play information on the disk in accordance with an order specified on the CD.

All enhanced CD's and standard CD's have a similar data organization that consists of a Table of Contents (TOC) and data files. The data files can be of a text type, audio type, graphic type, etc. The TOC has information such as: file type, number of files, start position for each file, and length of file.

The interpretation of the text file on the enhanced CD is unique. Once the firmware has detected that there is an enhanced CD in the unit, the data within the table is read and saved in the microcontroller. When a CD is inserted in the player, the firmware looks for the special formatting on track zero indicating this is an enhanced CD. If the CD is a standard (not enhanced) CD, this information will not be found, so the firmware will control the player for standard operation.

When the CD player reads the TOC and detects a text file, it further examines the file to verify it is in the enhanced CD format. There are two different types of enhanced CD's: the time/date CD and the sequential CD. The microcontroller reads the text file and checks the TYPE section as shown on the table. The type field indicates if the enhanced CD is a time/date format or a sequential format and conditions the firmware for that mode of operation. When the CD is inserted in the CD ROM drive, the CD module immediately reads the control information from the table of contents track (track 0) to determine the type of CD that has been inserted. If this is a sequential enhanced CD, the TOC will be recognized as sequential enhanced and the play list information on that track will be saved to non-volatile memory. This information consists of the start and stop times on the individual files (songs, readings, etc).

When the user desires to activate the sequential function, the play button is momentarily depressed. This command is received by the CD module and commands are issued to the CD ROM drive which will cause the unit to start playing the information at the current location specified by the play list information.

If no user action is taken, the CD module allows the current file to be played until the time previously saved in the play list information indicates that this file has ended. This is accomplished by tracking the number of seconds of play time in each file, and when the end time in the play list for that record is reached, the CD module will issue a command to the CD ROM drive to stop the playback. This new time is now the start time for the next sequential playback.

In the event the user wishes to pause the playback, the snooze button can be momentarily depressed. This causes the CD module to issue a stop play command to the CD ROM drive terminating the current file playback. In this case, the user can start the player back up at the exact place of pause by momentarily pressing the play button on the keyboard. At the firmware level, this is accomplished by the microcontroller capturing the time in seconds where the pause was initiated and then directing play to continue at that point when play is resumed.

The time/date-enhanced mode begins upon insertion of a time/date enhanced CD in the CD ROM drive. Again, the CD module reads the TOC information and recognizes the CD as a specially formatted time/date enhanced CD. The time/date enhanced CD operation differs from the sequential CD in that the time/date CD contains information on the data track which encodes the time and date that each file (song, readings, etc.) are to take place. This function is armed when the CD alarm function is activated. When the alarm is activated, the CD module firmware reads the current time from the internal clock module for determining the actual time and date. This information is then compared to the play list information that was read when the disk was loaded. At this point, firmware matches the current time of day to the information from the play list and directs the CD ROM drive to play the information as formatted in the play list.

Another mode of operation of the time/date function is when the user desires to manually activate the play function. Again, when this is activated the CD module firmware will compare the current time and date information from the clock module the information in the play list and direct that the information at some specific point on the CD ROM be played to the user.

The present invention is embodied in device 10, which may be a CD Clock radio or the like. Device 10 includes Radio function 12, Display function 14, Human Machine Interface function 16, CD Reader function 18, Processor 20, Clock Calendar function 22, Audio function 24, Decode function 26, and Alarm function 28.

Processor 20 includes logic, inter alia, in accordance with the present invention, for determining whether a standard CD or one in accordance with the invention is inserted. If a standard CD is detected operation of device 10 proceeds as usual according to typical CD or CD clock radio functions.

Figure 2:
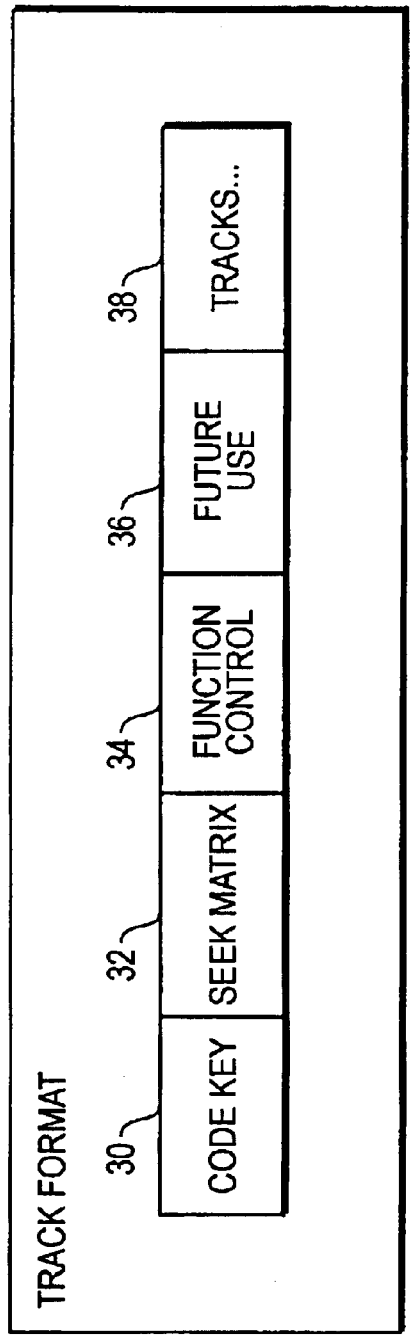
FIG. 2 illustrates a CD format useful with the present invention.

FIG. 2 represents an illustrative CD header and track format in accordance with the invention. While an exemplary track format is shown and described, those having skill in the art will appreciate that other formats or track layouts may be employed.

For the operation of the present invention it is necessary, however, that processor 20 be appropriately programmed for recognizing the CD format and function accordingly. FIG. 2, thus, shows key elements of a CD message track 30, in keeping with the present invention. Segment 32 contains Code Key designating the special CD readable by processor 20 (FIG. 1). Code Key segment 32 is used by processor 20, as will be described below, for decrypting the remainder of track 30. CDs formatted in keeping with the present invention may be played only in CD players whose processors are appropriately programmed.

The Seek Matrix is encoded in segment 34; and Function Control, in segment 36. A Future Use segment 38 is reserved for follow-on features and functionality, which may arise in the future. Message segment 40 follows Future Use segment 38. Processor 20 uses the information in Seek Matrix segment 34 to determine which Message track in Message segment 40 corresponds to a specific date and time of date.

Function Control segment 36 is designated to hold CD provider-specific information about how to interpret or respond to events in a customized manner. For example, a CD provider may decide that preview of CD messages corresponding to future dates is not allowed. Function Control segment 36 could be used to communicate that functionality to the device of the invention.

Providers of CDs formatted for use in device 10, FIG. 1, create content correlated to particular dates, and further, to general times of day. By way of example, a CD provider may choose seasonal, daily inspirational messages for morning and evening listening by subscribers. Providers may distribute such CDs on a monthly, quarterly or other temporal basis to those subscribers having a device such as that shown in FIG. 1. The encrypted content may only be played on players equipped with a decrypting processor 20.

Figure 3:
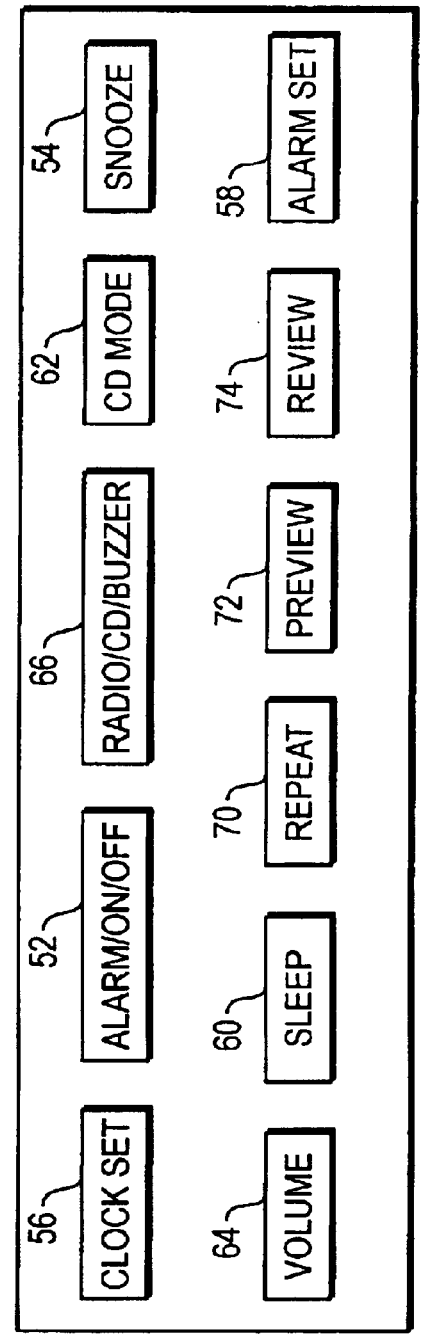
FIG. 3 provides a user interface panel suitable for use with the present invention.

FIG. 3 shows an exemplary user interface panel 50 for communicating with processor 20, FIG. 1. Panel 50, related to interface box 16, FIG. 1, is strictly illustrative and is shown to provide an understanding of the options functionally available to a user of a device in accordance with the present invention. Obviously, other arrangements and combinations are within the skill of art. Rectangular push buttons are shown for simplicity but other means, such as dials, sliders or the like, for enabling user selection of options are fully within the scope of the present invention.

As shown in FIG. 3, several options such as ON/OFF, VOLUME, SNOOZE, SLEEP, CLOCK SET, ALARM SET and the like are standard in the clock radio art. The following description emphasizes functions new or modified as part of the present invention.

Figure 5:
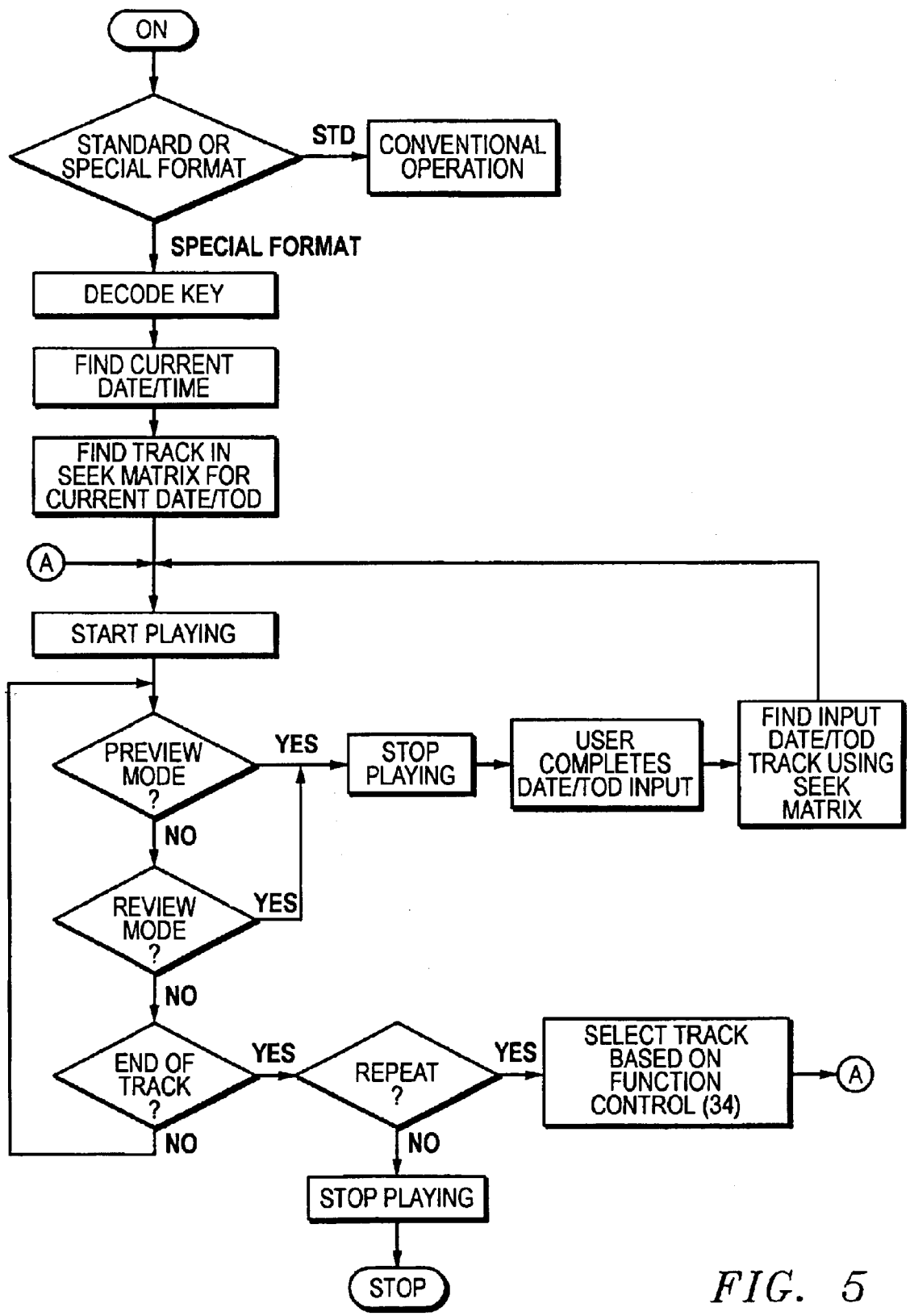
FIG. 5 depicts a logic flow diagram of the operation of the present invention in ON mode.

A CD clock radio type device in accordance with the present invention operates in a conventional manner unless a CD formatted in a special manner as exemplified in FIG. 2 is inserted. Thus, user option input boxes ALARM/ON/OFF 52, SNOOZE 54, CLOCK SET 56, ALARM SET 58, SLEEP 60, CD MODE 62, VOLUME 64, and RADIO/CD/BUZZER 66 function normally if a standard CD is inserted or no CD is present. CD MODE box 62 provides additional function when a CD format such as depicted in FIG. 2 is encountered. The same is true of REPEAT box 70. PREVIEW box 72 and REVIEW box 74 functions operate as shown in FIG. 5 only when a specially formatted CD, e.g., as shown in FIG. 2, is inserted. REPEAT, PREVIEW and REVIEW operate normally for a standard format CD.

User option selections and the subsequent operation of device 10, FIG. 1, will be more clearly understood having reference to FIGS. 3 through 6.

Figure 4:
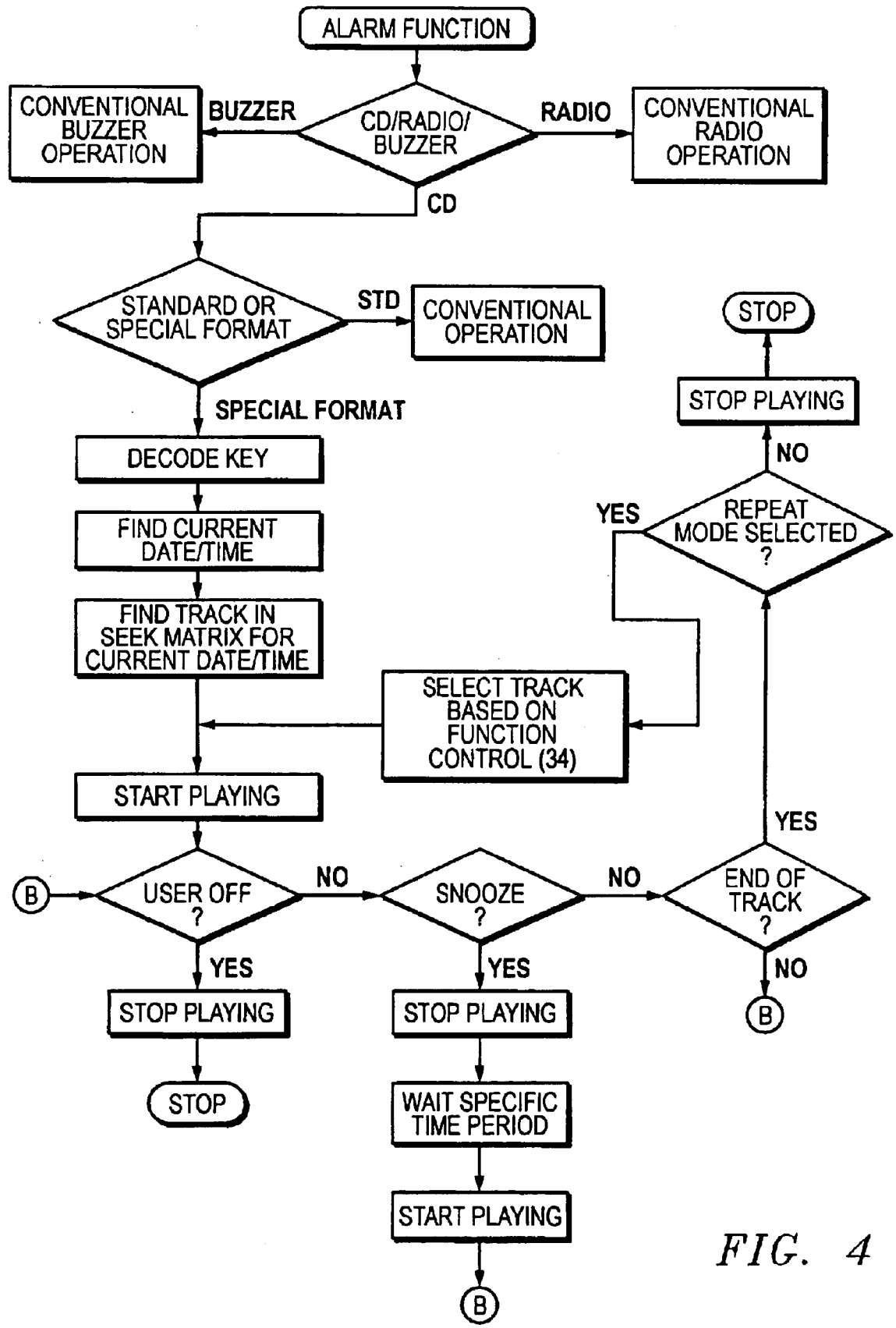
FIG. 4 is a logic flow diagram of the operation of the present invention in ALARM mode

FIG. 4 shows the logic followed by processor 20, FIG. 1, in response to user option choices in the ALARM mode. FIG. 4 illustrates the logic executed when a user of device 10, FIG. 1, desires that device 10 operate as an alarm. The logic begins at terminal 100. At test 102, the logic determines whether sound from a buzzer, radio or CD has been chosen by the user. Operation of device 10 proceeds in a conventional manner, well understood in the art, if a buzzer alarm or radio alarm is desired as indicated at steps 104 and 106, respectively.

If the user has chosen CD, then the logic determines at test 108 whether a CD is in position and, if so, in which of at least two formats it is recorded. Not shown, but well understood, is the generation of an alert to the user in the case where no CD has been loaded. If the logic finds a CD in a standard format, conventional operation proceeds at step 110.

Upon finding a specialized, non-standard format such as described in connection with FIG. 2, the logic decodes the Code Key (32, FIG. 2) at step 112. Thereafter the logic obtains the current date and time from the clock/calendar (22, FIG. 1) at step 114. Next, at step 116, the logic locates within Seek Matrix 34, FIG. 2, a date/time entry corresponding to the current date/time obtained in step 114, and plays the appropriate CD track at step 118. The logic then awaits further user input or for an end of track condition. If the logic receives an off signal from the user as indicated at test 120, then CD play is shut down at step 122 and device 10 operation ends at terminal 124.

If no user Off actuation is detected at test 120, then the logic checks at step 126 whether the user has hit the snooze button. If so, at step 128, the logic ceases CD play. After waiting a predetermined period of time at step 130, CD play restarts at step 132 and the logic branches back to step 120.

If, however, there is no SNOOZE request, the logic then checks if an end of track condition is detected at step 134, whence the logic branches back to step 120.

Once the end of track is reached, CD play is stopped at step 136 and the logic checks at step 138 for a user selection of repeat mode. If not found, operation of device 10 ceases at terminal 142.

If the user has chosen REPEAT mode, then at step 140 the logic looks at the Function Control data (36, FIG. 2) and uses that information to select a track. Control is passed to step 120 for playing the selected track.

FIG. 5 illustrates the logic performed in processor 20 when user options are entered in the ON, i.e. non-ALARM mode. When a device such as device 10, FIG. 1, is in the ON-mode, processor 20 begins at terminal 200 and at test 202 the logic determines whether a standard or specially formatted CD is present as above described. If processor 20 determines that a standard CD is present, conventional operation occurs as indicated at step 204. Having detected a specially formatted CD, the logic of step 206 decodes a key such as a Code Key 32 in FIG. 2. The logic next obtains a current date and time at step 208 and at step 210 finds the track using Seek Matrix 34, FIG. 2, corresponding to the current date and time. At step 212, the CD is played. At step 214, the logic tests whether the user has set the PREVIEW mode. If so, the logic stops the CD player at step 216 while awaiting a user input completing the desired advance date and time of day at step 218. Thereafter, at step 220, the logic utilizes the user input advance date and time of day to find track matching that date and time of day in the Seek Matrix and control returns to step 212.

If at step 214, the PREVIEW mode was not found to be set, a test is made at step 222 to determine whether a REVIEW mode is active. If so, control passes to step 216. If REVIEW mode has not been activated, a test is made at step 224 to determine whether the end of track has been reached. If not, control is returned to step 214.

However, if the end of track has been reached, play of the CD is stopped at step 226 and the logic checks at step 228 to see if REPEAT mode has been activated. If not, the operation of device 10 concludes at step 230. If, however, the REPEAT mode has been activated, the logic then goes to step 232 to select a track for REPEAT play based on the contents of function control 36 in FIG. 2. Thereafter, control returns to step 212.

Figure 6:
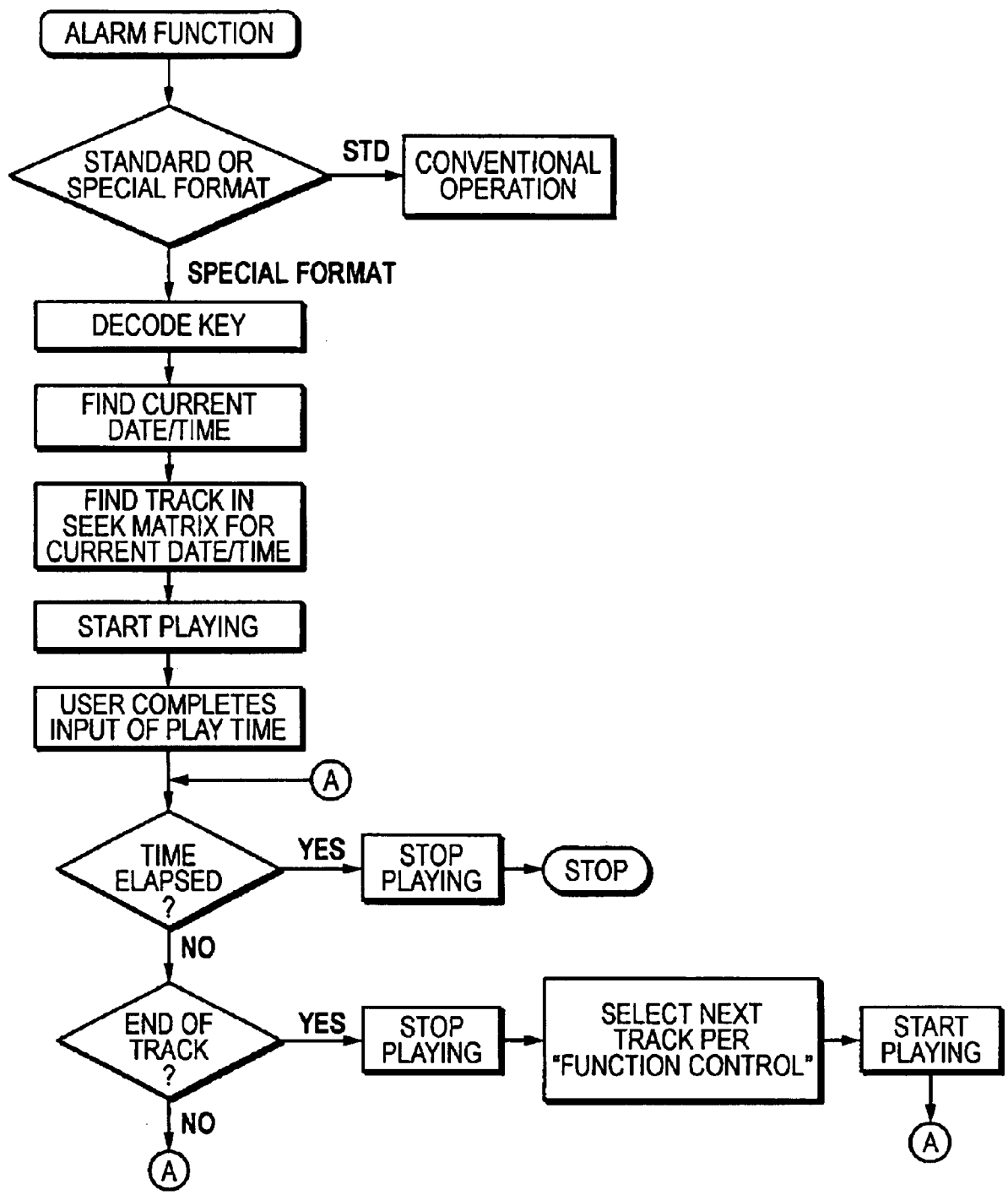
FIG. 6 illustrates a logic flow diagram of the operation of the invented device present invention in SLEEP mode.

FIG. 6 illustrates the logic performed in Processor 20 when user options are entered in the SLEEP, i.e. non-ALARM mode. The logic begins at terminal 300. At step 302, the logic determines whether the CD is in a standard or special format and, if it is a standard format CD, conventional operation ensues as indicated at step 304.

If, however, a specially formatted CD has been inserted, the logic proceeds to decode a key at step 306 and to obtain the current date and time at step 308. Having obtained the current date and time of day, the logic uses a Seek Matrix on the CD to find the track on that CD corresponding to the current date and time of day at step 310. At step 312, the CD is played and at step 314 the logic executing in processor 20 awaits input of playtime by the user of device 10. At step 316, a test is made to see if that time has elapsed. If it has, then at step 318, play of the CD ceases and operation of device 10 stops at step 320. If, however, the time has not yet elapsed, then at step 322 the logic determines whether the end of track has been reached. If not, control is returned to step 316. If, however, the end of track has been reached, then at step 324 play of the CD ceases. The logic then selects the next track in accordance with the contents of the function control segment of the CD at step 326 and play of the CD commences at step 328. Thereafter, control returns to step 316.

Figure 7:
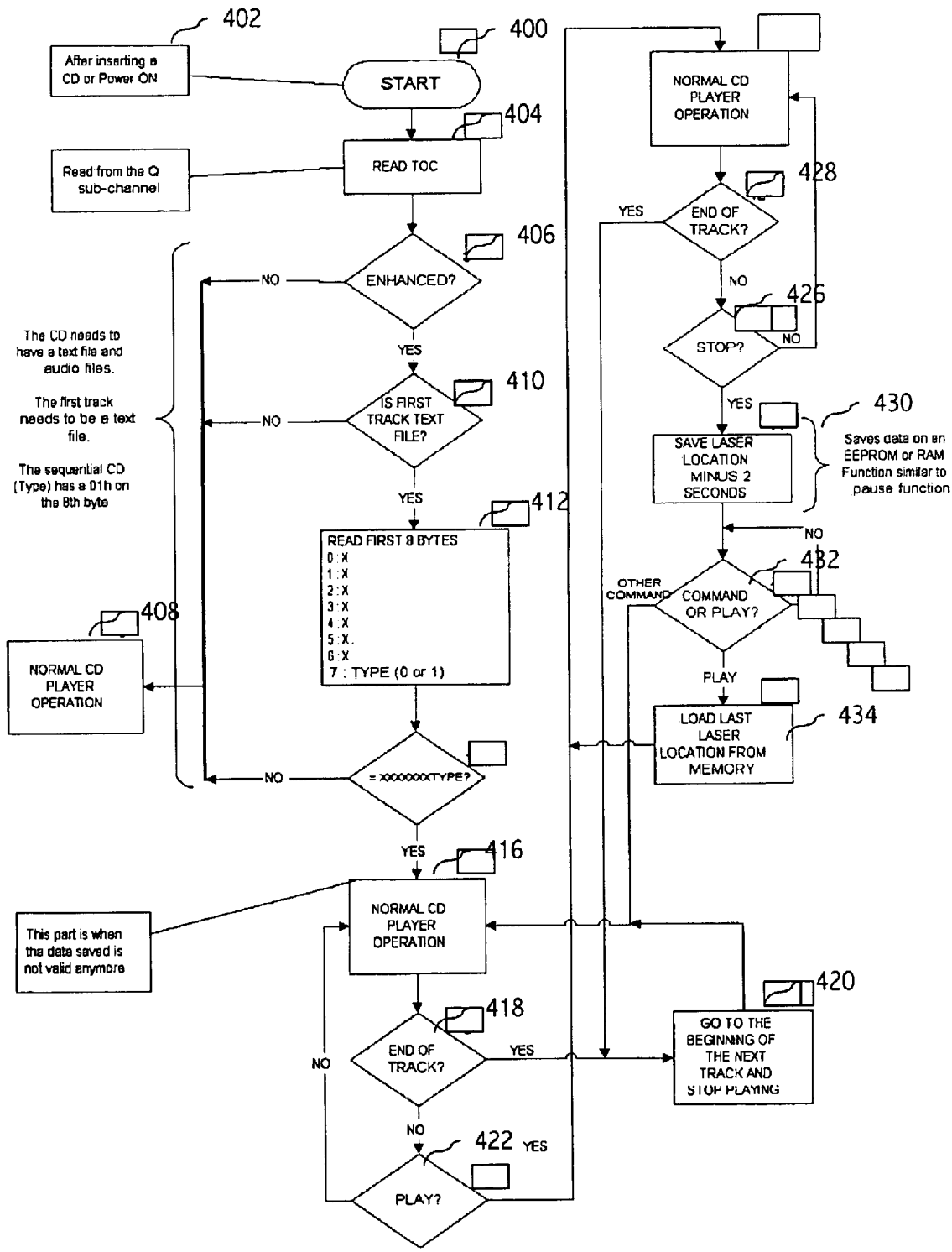
FIG. 7 provides a sequential operation flowchart of the present invention.

FIG. 7 describes the flow/steps necessary to implement enhanced CD functionality into a standard audio CD player such as the AP169 model. The enhanced mode of operation uses the baseline AP169 coding with modifications required to implement the special PLAY and STOP functions as described below. The enhanced CD player of the present invention uses specially formatted CD's. These CD's in essence are a combination of a text CD and a normal audio CD. This CD contains coding in the table of contents data on track 0 which identifies it as an enhanced CD. Further coding on track 1 which is a text track, validates that the CD is an enhanced CD using the sequential play format. The primary difference between the sequential enhanced CD function and the normal AP169 function is how the PLAY and STOP functions are implemented. Once the microcontroller code has identified the CD as a sequential enhanced CD, the current CD play position is stored whenever the STOP button is pressed so that the audio will be picked up at exactly the same point when the PLAY button is pressed again. Note that this is very similar to the normal PAUSE mode except the spindle motor will be stopped to conserve battery life. In step 400, the start function activates immediately following insertion of the CD at step 402 into the CD player. The CD play powers on at this time and the servo mechanism are directed to CD track 0 in order to read the TOC data in step 404. After the servo is slewed to track data, the microprocessor commands a read of the TOC data on track 0. The TOC data located within the Q subcode data contains flag bits, which designated the CD as being an audio only CD, a data CD, or may other types of CD including an enhanced CD as determined at decision point 406. Existing AP 169 code looks for an audio CD. New AP169 code must also look for an enhanced CD. If the CD is identified as being enhanced at decision point 406 by the microcontroller, testing for an enhanced CD code and if the enhanced CD code flag is detected, the CD microcontroller should immediately sequence the servomechanism to look at the track 1 data. If it is not an enhanced CD, then the microcontroller should return to its normal AP169 code processing. In the event the enhanced code flag was set when the TOC was read in step 406, a further test examines the track 1 data in step 410. This data will be TEXT data if the CD is enhanced. If the format of the data at decision point 420 is not text, then the CD is not an enhanced CD and the microcontroller should return to its normal AP169 code processing at step 408. On track 1, the first 7 bytes are bit pattern $19, $F6, $C2, $FE, $F8, $38, $7D. These first seven bytes are checked and matched to this code in step 412. In the event the code does not match the inserted CD in step 144, the CD is not an enhanced CD and the microcontroller returns to its normal AP169 code processing at step 408. If the first seven bytes match this code the eighth byte should be checked to verify the inserted CD is a sequential play CD which is determined if the bit pattern is $01. In the event the eighth byte is 00000001 base 2, then the CD that has been inserted is the sequential play CD. At this point, control is passed to block 416. If the pattern is other than $01, then the player should sequence to step 468 for normal CD operation.

At this point, the microcontroller scans the play, pause, Stop, etc. buttons to look for a play command. The code will cycle at this point looking for the play button to be selected. The track check at step 418 is performed in the enhanced mode to look for an end of track condition. If so, the firmware will sequence to step 420 which positions the laser to the beginning of the next track and stops play.

Once the play button is selected in step 422, the CD servo is selected to track #2 (or greater if entered after the first track play sequence) and the unit functions as a normal AP169 at step 424. Again, after PLAY is pressed, the CD is pointed to track #2 or beyond and normal AP169 function is executed by the microcontroller. This continues until the STOP button is pressed in step 426. If the end of track is detected at step 428, then control returns to step 420 where the unit is sequenced to the beginning of the next track and play stops. When the stop button is pressed at step 420, the microcontroller reads the current position of the compact disk, subtracts a predetermined amount of time such as three seconds of time from this value and saves this in RAM or EEPROM at step 430. If the command is other than play as shown in step 432, control returns to step 416 to normal operation. If the command is PLAY control returns to step 434. When PLAY is reinitiated after a manual STOP command in step 434, the audio is picked up three seconds prior to when the player was stopped. Control is then passed to normal operation.

Although the present invention is described in detail, it should be understood that various changes, substitutions and alterations can be made hereto without departing from the spirit and scope of the invention as described by the appended claims.

What is claimed is:

1. A system for delivering audio content correlated to the time and/or date of a calendar comprising:

a compact disk drive coupled to multiple processors, wherein said multiple processors implement enhanced CD functionality and reside on a printed circuit board, and wherein said multiple processors control clock and display functions, and to transfer control, command and digital audio data to and from said compact disk drive and wherein said multiple processors determine whether a compact disk inserted into said compact disk drive is a particular format for accessing and playing a track, having a date and time of day indicator, when said track date and time match with a current date and time of day in said calendar and clock; and a user display coupled to said printed circuit board;

an input device coupled to said printed circuit board;

a radio module coupled to said printed circuit board; and an audio output device operable to select an audio signal from said radio module or said compact disk drive.

2. The system of claim 1, wherein said user display comprises a liquid crystal display.

3. The system of claim 1, wherein said input device comprises a keyboard and or volume and function selector controls.

4. The system of claim 1, wherein said audio output device comprises at least one speaker.

5. The system of claim 1, wherein said compact disk drive interfaces to said printed circuit board via an Advanced Technology Attachment Packet Interface.

6. The system of claim 1, wherein said multiple processors comprise:

a first processor tasked with clock and display functions; and a second processor tasked with transfer control, command and digital audio data to and from said compact disk drive, and wherein said first and second processor pass data communicate with each other via an internal bi-directional digital data bus.

7. The system of claim 1 wherein said audio output device comprises an audio multiplexer, audio amplifier and the operator controls.

8. The system of claim 1, wherein said enhanced CD functionality is implemented by code executed by said multiple processors, wherein said code detects enhanced compact disks.

9. The system of claim 7, wherein said enhanced compact disks comprise either time/date enhanced CD format or the sequential enhanced CD format.

10. The system of claim 8, wherein said multiple processors communicate data such as time, date, track information, play and stop commands.

11. The system of claim 1, wherein said audio output device comprises two single channel audio amplifiers that condition and amplify signals received from the compact disk drive or said radio module for output to at least one speaker.

12. The system of claim 3, wherein said keyboard comprises a 12 key matrix design to enter the parameters and data.

13. The system of claim 3, wherein said radio can be digitally tuned based on keyboard input.

14. The system of claim 13, wherein said multiple processors receive an input for and decode a key code on said compact disk indicating said particular format, and treat said compact disk as a conventional compact disk when said key code is not detected.

15. The system of claim 13, wherein a desired play mode from among a plurality of possible play modes.

16. The system of claim 14, wherein said plurality of possible play modes comprises SLEEP, SNOOZE, REPEAT, REVIEW and PREVIEW.

17. The system of claim 13, wherein a particular compact disk format comprises an encrypted header key for use in decrypting compact disk track data.

18. The system of claim, 16, wherein said header additionally comprises a function control segment having compact disk specific rules for use.

19. The system of claim 17, further comprising search and function control segment for a compact disk specific mode when said play mode is PREVIEW or REVIEW.

* * * * *